Nov. 15, 1960  R. R. ROSS  2,959,934
OIL SEPARATOR AND RETURN APPARATUS
Filed March 9, 1959
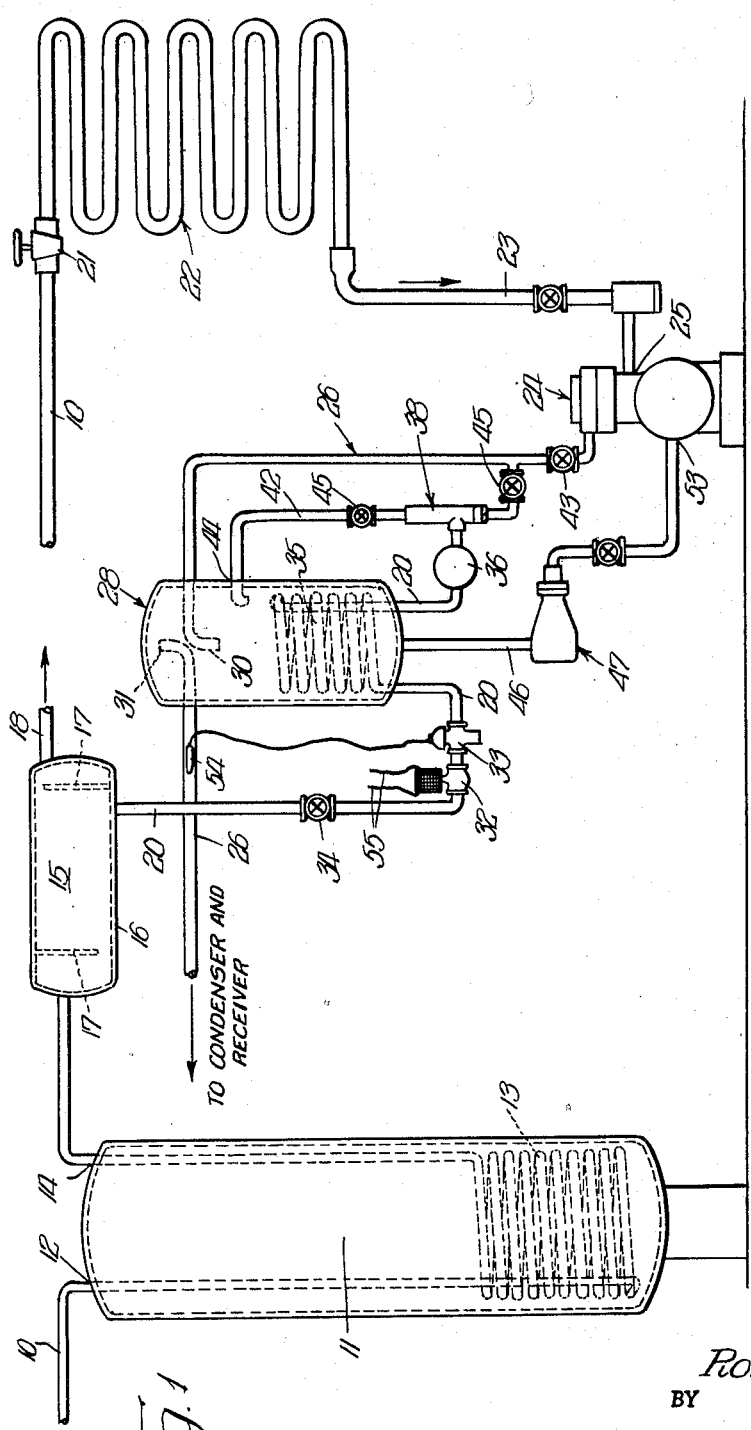
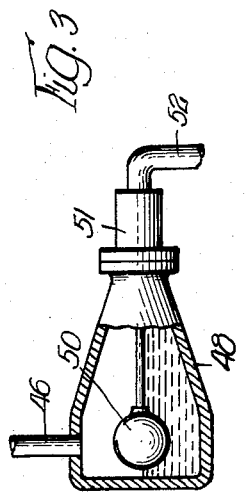
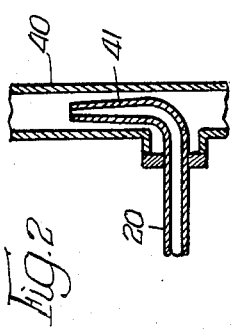
INVENTOR.
Robert R. Ross,
BY

United States Patent Office 2,959,934
Patented Nov. 15, 1960

2,959,934

OIL SEPARATOR AND RETURN APPARATUS

Robert R. Ross, Batavia, Ill., assignor to
Wayland Phillips, Chicago, Ill.

Filed Mar. 9, 1959, Ser. No. 798,223

6 Claims. (Cl. 62—192)

The invention relates to refrigerating systems and has reference in particular to improvements especially designed for refrigerating systems of the compressor type for controlling the drainage of oil from the systems either manually or automatically with one device.

It is well known that lubricating oil destroys the high operating efficiency of the evaporator in refrigerating systems and that said oil has other detrimental effects. It is therefore most desirable that the lubricating oil be extracted from the refrigerating medium so that as little as possible will reach the apparatus in which the work of refrigeration is carried on. The oil control and return arrangement of the invention removes the oil from the refrigerant such as ammonia by means of a separator located in the liquid line and the arrangement also controls drainage of all the oil from the refrigerating system by relatively simple apparatus, capable of automatic operation or which may be operated by hand.

Another object is to provide oil drainage apparatus which will utilize the low temperature in the oil-refrigerant mixture as obtained from the liquid line separator for cooling the high temperature refrigerant gas discharged by the compressor, whereby the discharge line oil separator is rendered more effective.

Another object is to provide oil drainage apparatus as described and which will utilize the heat in the refrigerant gas from the compressor for heating the oil-refrigerant mixture whereby to evaporate the liquid ammonia in the mixture.

Another object of the invention resides in the provision of apparatus which will inject the oil-refrigerant mixture obtained from the liquid line separator into the compressor discharge line upstream of the separator for the discharge line, thus making it possible to collect all of the oil in the discharge line oil separator.

With these and other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a diagrammatic elevational view of certain essential parts of an ammonia refrigeration system showing the improved apparatus in operative association therewith;

Figure 2 is a fragmentary sectional view showing an injector suitable for use in the oil drainage system of the invention; and Figure 3 is a fragmentary sectional view of a float valve of the type that can be used in the present oil drainage system.

Referring to the drawings and to Figure 1 in particular, the liquid refrigerant feed line 10 enters the heat exchanger 11 at the top end thereof as at 12 and the feed line continues to the bottom of the tank where it is coiled at 13 to facilitate the cooling of the liquid refrigerant within the line. The line emerges from the tank at 14 and enters the liquid line oil separator 15. The separator includes the cylinder 16 having the baffles 17 and the outlets 18 and 20. Outlet 18 continues the liquid refrigerant feed line until it connects with the evaporator 22 at the expansion valve 21. From the evaporator 22 the suction line 23 for the expanded refrigerant gas enters the compressor 24 at 25. In the conventional manner the pressure of the gaseous refrigerant is increased by the pumping action of the compressor 24 and the high pressure gas is discharged into the compressor discharge line 26, which line connects with the oil separator designated in its entirety by the numeral 28. From the separator 28 the compressor discharge line 26 continues and the same eventually connects with the condenser and receiver of the refrigerating system to complete the circuit. Line 26 at the inlet to the oil separator 28 has a downturned end 30 whereas the upturned end 31 forms the outlet for continuing the flow of the refrigerant gas from the separator.

Referring to the outlet 20 for conducting the oil and ammonia mixture from the liquid line oil separator 15, it will be observed that the outlet line depends vertically and connects with the solenoid valve 32 and with the metering valve 33. A hand valve 34 may be located in the outlet 20 at a point intermediate the separator 15 and the valve 32. From the metering valve 33, the outlet line 20 enters the bottom of the discharge line separator 28 and the same is coiled within the bottom of the separator as indicated by numeral 35. From the coiled section 35 the outlet line 20 leaves the separator 28 at the bottom thereof and connects with a sight glass 36 in advance of connecting with the injector 38. The injector is shown in section in Figure 2, the same comprising conventional structure, including a cylindrical body portion 40 and the nozzle 41 having location within the cylinder 40 for discharging the oil-ammonia mixture supplied to the nozzle by the outlet line 20. The high pressure gaseous discharge line 26 is provided with a bypass 42 which connects with line 26 above hand valve 43 and enters the oil separator 28 adjacent the upper portion thereof at 44. Hand valves 45 may be located in the bypass on respective sides of the injector 38.

The injector operates in a manner to elevate the oil-ammonia mixture and to deliver the same to the oil separator 28. This is accomplished by the high pressure gaseous refrigerant which is admitted to the injector when the gas is caused to flow in the bypass 42. Since the outlet end of the bypass terminates within the oil separator 28, the oil-ammonia mixture and the gaseous refrigerant are discharged within the said oil separator, and thus in accordance with the invention the separator collects all of the oil circulating within the refrigerating system. The interchange of heat effected by the coil 35 within the oil separator, evaporates the liquid ammonia in the mixture and also produces some cooling of the high pressure gaseous refrigerant delivered to the separator. By thus cooling the high pressure gaseous refrigerant, an improved and more efficient separating of the oil is obtained in the separator 28.

The oil collecting in the bottom of the separator 28 drains through the pipe 46 and which delivers the oil to the float valve designated in its entirety by numeral 47. Said valve as shown in Figure 3 consists of a housing 48 for the float 50 and which controls in a conventional manner a valve located in the section 51 of the structure. The oil collects within the bottom of housing 48 and the same is periodically discharged to oil line 52 which connects at 53 with compressor 24 and accordingly returns all the oil drained from the oil separator 28 to the said compressor.

The oil-ammonia mixture removed from the oil separator 15 by the outlet 20 must flow through the metering valve 33. As shown in Figure 1, the metering valve is controlled by the bulb 54 which is responsive to the temperature of the gaseous refrigerant discharge line 26 downstream of oil separator 28. However, the metering valve could be a fixed orifice, or a hand valve might be substituted therefor, or the automatic valve as shown might be controlled by temperature of the gaseous refrigerant at locations other than that as shown. The solenoid valve 32 is electrically connected by means of the terminals 55 with the electric motor operating the compressor, and the valve is caused to open only during those periods when the compressor is operating.

In the separating apparatus of the invention the oil is removed from the liquid refrigerant in the separator 15 as an oil-refrigerant mixture and the same is delivered by the outlet 20 to the heat exchanging coil 35. The interchange of heat as effected by the coil causes an evaporation of the refrigerant in the mixture and the gaseous refrigerant within the separator 28 is also cooled. A feature of the invention in connection with the injector 38 resides in the fact that the mixture from the coil is delivered to the high pressure gaseous refrigerant line 26 upstream of the separator 28. Accordingly all of the oil from the line will be removed by the separator.

What is claimed is:

1. In a refrigerating system including a compressor, an evaporator, a liquid refrigerant feed line and a high pressure gaseous refrigerant line, the combination with a first oil separator in the liquid line, of a second oil separator in the high pressure gaseous refrigerant line, an outlet pipe connecting with the liquid line separator for draining an oil-refrigerant mixture from said first separator, said outlet pipe having connection with the high pressure gaseous refrigerant line upstream of the second separator, whereby said oil-refrigerant mixture is delivered to the second separator, and a connection from the bottom of the second separator to the compressor.

2. In a refrigerating system including a compressor, an evaporator, a liquid refrigerant feed line and a high pressure gaseous refrigerant line, the combination with a first oil separator in the liquid line, of a second oil separator in the high pressure gaseous refrigerant line, an outlet pipe connecting with the liquid line separator for draining an oil-refrigerant mixture from said first separator, a heat exchanging coil located in the second separator, said outlet pipe having connection with the inlet to the heat exchanging coil, the outlet of said coil connecting with the high pressure gaseous refrigerant line upstream of the second separator, whereby the oil-refrigerant mixture from the first separator is delivered to the second separator, and a conduit connecting with the bottom of the second separator for draining oil therefrom.

3. In a refrigerating system including a compressor, an evaporator, a liquid refrigerant feed line and a high pressure gaseous refrigerant line, the combination with a first oil separator in the liquid line, of a second oil separator in the high pressure gaseous refrigerant line, an outlet pipe connecting with the liquid line separator for draining from said first separator an oil-refrigerant mixture separated from the liquid refrigerant by said separator, a heat exchanging coil located in the second separator, said outlet pipe having connection with the inlet to the heat exchanging coil, the outlet of said heat exchanging coil connecting with the high pressure gaseous refrigerant line upstream of the second separator, whereby the oil-refrigerant mixture from the first separator is delivered to the second separator, a conduit connecting with the bottom of the second separator for draining oil therefrom, and a metering valve in the outlet pipe in advance of the inlet to the heat exchanging coil.

4. A refrigerating system as defined by claim 3, additionally including a solenoid valve in the outlet pipe from the first separator and having a location in advance of the metering valve.

5. In a refrigerating system including a compressor, an evaporator, a liquid refrigerant feed line and a high pressure gaseous refrigerant line, the combination with means for separating oil from the liquid refrigerant flowing in the feed line, an outlet for said oil, an oil separator in the gaseous refrigerant line, a heat exchanging coil in the oil separator, means connecting the outlet with the said coil, a by-pass conduit connecting with the gaseous refrigerant line upstream of the separator and having its outlet end terminating within the separator, an injector located in the by-pass conduit, a connection from the heat exchanging coil to the injector, whereby the oil flowing in the outlet is supplied to the injector for delivery by said injector to the separator, and a pipe joining the bottom of the separator with the compressor.

6. A refrigerating system as defined by claim 5, additionally including a metering valve in the outlet in advance of the heat exchanging coil.

References Cited in the file of this patent

UNITED STATES PATENTS

| | | |
|---|---|---|
| 320,308 | Suckert | June 16, 1885 |
| 320,309 | Suckert | June 16, 1885 |
| 342,543 | Schnehle | May 25, 1886 |
| 2,661,605 | Tiggett et al. | Dec. 8, 1953 |
| 2,749,723 | Webber | June 12, 1956 |